(12) United States Patent
Li et al.

(10) Patent No.: US 7,765,093 B2
(45) Date of Patent: Jul. 27, 2010

(54) NETWORK MODELING SYSTEM AND METHOD OF SIMULATING NETWORK OPERATION WITH CONFIGURABLE NODE MODELS

(75) Inventors: Chris Cho-Pin Li, New York, NY (US); Connie Chui-Jun Lau, Clifton, NJ (US); Christine Marie Cruz, Parsippany, NJ (US); Yu-Jih Liu, Ledgewood, NJ (US); Chang-June Yoon, Edison, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 866 days.

(21) Appl. No.: 11/228,227

(22) Filed: Sep. 19, 2005

(65) Prior Publication Data

US 2007/0076628 A1     Apr. 5, 2007

(51) Int. Cl.
  *G06F 17/50* (2006.01)
  *G06F 15/173* (2006.01)
(52) U.S. Cl. .......................................... 703/13; 709/223
(58) Field of Classification Search ................... 703/13; 709/223
  See application file for complete search history.

(56) References Cited

U.S. PATENT DOCUMENTS

| | | | |
|---|---|---|---|
| 5,454,078 A * | 9/1995 | Heimsoth et al. ........... | 709/222 |
| 5,715,432 A | 2/1998 | Xu et al. | |
| 5,742,795 A | 4/1998 | Küssel | |
| 5,754,831 A | 5/1998 | Berman | |
| 5,794,128 A | 8/1998 | Brockel et al. | |
| 5,809,282 A | 9/1998 | Cooper et al. | |
| 5,845,124 A | 12/1998 | Berman | |
| 6,134,514 A * | 10/2000 | Liu et al. ..................... | 703/17 |
| 6,272,450 B1 | 8/2001 | Hill et al. | |
| 6,336,138 B1 | 1/2002 | Caswell et al. | |
| 6,393,290 B1 | 5/2002 | Ufongene | |
| 6,408,185 B1 | 6/2002 | Freeman et al. | |
| 6,442,507 B1 | 8/2002 | Skidmore et al. | |
| 6,771,957 B2 | 8/2004 | Chitrapu | |

(Continued)

FOREIGN PATENT DOCUMENTS

DE        10104926 A1    11/2001

(Continued)

OTHER PUBLICATIONS

Ma, J, et al. "A Simulation Model for IP Multicast with RSVP (RFC2490)". *The Internet Society*. 1999.

(Continued)

*Primary Examiner*—Dwin M Craig
(74) *Attorney, Agent, or Firm*—Edell, Shapiro & Finnan, LLC

(57) ABSTRACT

A node model of the present invention is employed by a network modeling and simulation system and includes a communication protocol stack with a plurality of protocol layers. Each protocol layer includes communication functions. The protocol layer functions are each represented by one or more distinct software implementations that are optimized for different simulation purposes. A configurable module switch is disposed between protocol layers within the stack to selectively control information flow between functions within adjacent protocol layers. The node model enables a user to perform network simulation or analysis of varying detail or granularity.

16 Claims, 12 Drawing Sheets

U.S. PATENT DOCUMENTS

| | | | |
|---|---|---|---|
| 6,820,042 | B1 | 11/2004 | Cohen et al. |
| 6,836,467 | B2 | 12/2004 | Stanley |
| 6,901,357 | B1 * | 5/2005 | Patiejunas .................... 703/14 |
| 2001/0011215 | A1 | 8/2001 | Beeker et al. |
| 2003/0007479 | A1 | 1/2003 | Abrol et al. |
| 2003/0086405 | A1 | 5/2003 | Silva et al. |
| 2003/0093259 | A1 | 5/2003 | Kolbe |
| 2003/0115036 | A1 | 6/2003 | Chen |
| 2004/0110518 | A1 | 6/2004 | Swift et al. |
| 2004/0122645 | A1 | 6/2004 | Shevenell et al. |
| 2004/0165561 | A1 | 8/2004 | Chiou et al. |
| 2004/0171390 | A1 | 9/2004 | Chitrapu |
| 2004/0172231 | A1 | 9/2004 | Barbaresi et al. |
| 2004/0186701 | A1 | 9/2004 | Aubin et al. |
| 2004/0199370 | A1 | 10/2004 | Arama et al. |
| 2004/0249621 | A1 | 12/2004 | Alicherry et al. |
| 2004/0261116 | A1 * | 12/2004 | Mckeown et al. ........... 725/109 |

FOREIGN PATENT DOCUMENTS

| | | | |
|---|---|---|---|
| EP | 1365545 | A1 | 11/2003 |
| GB | 2266608 | A | 11/1993 |
| JP | 03143294 | | 5/2003 |
| JP | 03179540 | | 6/2003 |
| WO | 9737479 | A3 | 10/1997 |
| WO | WO 01/010082 | A3 | 2/2001 |
| WO | WO 02/104055 | A1 | 12/2002 |
| WO | WO 03/049466 | A1 | 6/2003 |
| WO | WO 03/081428 | A2 | 10/2003 |
| WO | WO 03/092245 | A2 | 11/2003 |
| WO | WO 2004/077845 | A2 | 9/2004 |
| WO | WO 2004/095861 | A1 | 11/2004 |

OTHER PUBLICATIONS

Fall, Kevin, and Kannan Varadhan ed. "The ns Manual (formerly ns. Notes and Documentation)" A collaboration between researchers at UC Berkley, LBL, USC/ISI, and Xerox PARC. Oct. 21, 2005.pp. 1-403.

OPNET Technologies, "OPNET Modeler Advanced 1 Day Training" OPNET Optimum Network Performance, Copyright 2002.pp. 1-220.

"QualNet Simulator", Overview, Scalable Network Technologies, Culver City, CA 90230. Document #3708, Copyright 2004.

Bagrodia, Rajive, et al., "Parsec: A Parallel Simulation Environment for Complex Systems." *Computer Magazine*, Oct. 1998. vol. 31 No. 10, pp. 77-85.

* cited by examiner

```
# PLATFORM TYPE: MULTI-TIER

# NODE CONFIGURATIONS FOR EACH NODE
# <WF IP ADDRESS>  <NODE MODEL>  <X LOC>  <Y LOC>  <Z LOC>
      138.0.0.1     DS_1C_NODE      10       10       3
      138.0.0.2     DS_2C_NODE      20       25       3
```
142a

FIG.6

```
# PLATFORM TYPE: AERIAL

# NODE CONFIGURATIONS FOR EACH NODE
# <WF IP ADDRESS>  <NODE MODEL>  <X LOC>  <Y LOC>  <Z LOC>
      138.0.0.1      NL_NODE        10       10       3
      138.0.0.2      NL_NODE        20       15       3
```
142b

FIG.7

```
# PLATFORM TYPE: SENSOR

# NODE CONFIGURATIONS FOR EACH NODE
# <WF IP ADDRESS>  <NODE MODEL>  <X LOC>  <Y LOC>  <Z LOC>
      138.0.0.1      UGS_NODE       10       10       3
      138.0.0.2      UGS_NODE       20       20       3
```
142c

FIG.8

```
# NODE TYPE: MULTI-TIER, AERIAL, SENSOR
MULTI-TIER

# <PROCESSOR MODEL CONFIGURATION NAME>    <PROCESSOR MODEL>
            INTRANET                          DS_INTRANET
            COMSEC                             COMSEC
              •                                   •
              •                                   •
              •                                   •
```

FIG.11

NETWORK MODELING SYSTEM AND METHOD OF SIMULATING NETWORK OPERATION WITH CONFIGURABLE NODE MODELS

BACKGROUND OF THE INVENTION

1. Technical Field

The present invention pertains to network modeling and simulation systems. In particular, the present invention pertains to a network simulation system employing configurable node models selectively enabling varying levels of network analysis (e.g., low or high level granularity).

2. Discussion of Related Art

Currently, there are several commercial and non-commercial tools available in the area of network modeling and simulation that a network modeler may utilize to achieve modeling objectives. Some of these tools include OPNET, QualNet, PARSEC and NS-2. In most of the modeling tools, a communication protocol stack (e.g., with various communication protocol layers, such as a physical layer, a link layer, a network layer, a transport layer, a session layer, an application layer, etc.) for a simulated device (e.g., a wireless radio, etc.) is modeled in a node model as illustrated in FIG. 1. In particular, a node model 15 includes a communication protocol stack with a plurality of communication protocol layers 20. The protocol layers each include functions to perform desired communications. Each function of a protocol layer in the protocol stack is modeled by a software module and the signal flow (i.e., information exchange) between an upper-layer software module and a corresponding lower-layer software module is predefined and hard-coded in the related software implementations. In other words, once the development of the node model is completed, the flow of the protocol signal from a software module of a protocol layer can only be re-directed to the pre-designated software module of an adjacent protocol layer.

Although the above implementation of node models is adequate when the node models are applied to a narrowly defined set of simulation tasks (e.g., detailed simulation of a network at the expense of long CPU processing time, or abstract simulation of the network at the expense of simulation accuracy with shorter execution time), these node models suffer from several disadvantages. In particular, the above node models are pre-constructed with fixed software implementations. Accordingly, the traditional approaches employ an inflexible architectural design, thereby providing a negative impact on the cost of model development and the usefulness of developed models. Since the traditional architecture provides limited support of only one software implementation for each protocol layer function in the protocol stack, the developed node model is restricted to particular needs (and cannot support diverse needs, such as both detailed and abstract simulation of a network). In other words, when a traditional node model is constructed with software implementations optimized for detailed simulation of a network, the task becomes extremely difficult to re-use or adapt the node model to perform abstract simulation of the same network in order to shorten simulation execution time. Thus, separate traditional node models with different software implementations are required for different simulations or analysis (e.g. detailed versus abstract) of the network.

OBJECTS AND SUMMARY OF THE INVENTION

Accordingly, it is an object of the present invention to simulate network operation with flexible node models selectively enabling various granularity or analysis of simulated network operation.

It is another object of the present invention to employ node models within a network simulation system that enable configurable flow of information between functions within adjacent protocol layers of a node model communication protocol stack.

Yet another object of the present invention is to employ flexible node models within a network simulation system to enable re-use of the models for varying granularity or analysis of simulated network operation.

The aforesaid objects may be achieved individually and/or in combination, and it is not intended that the present invention be construed as requiring two or more of the objects to be combined unless expressly required by the claims attached hereto.

According to the present invention, a modeling architecture is employed by a network modeling and simulation system. The modeling architecture enables a modeler to develop network models with optimized software implementations that may be selected prior to or dynamically during a network simulation. A node model of the present invention includes a communication protocol stack with a plurality of protocol layers. Each protocol layer includes communication functions. The protocol layer functions are each represented by one or more distinct software implementations that are optimized for different simulation purposes (e.g., high granular implementation with slow execution speed versus abstract implementation with fast execution speed). A configurable module switch is disposed between protocol layers within the stack to selectively control information flow between functions within adjacent protocol layers. The node model enables a user to perform network simulation or analysis of varying detail or granularity. For example, a user may utilize the node model to configure a network simulation using a high granular (i.e., slower) software implementation to perform a detailed or low-level analysis of a smaller network, while another user may utilize the same node model to select a faster (but lower granularity) implementation to perform a high-level analysis for a large-scale network.

The present invention provides several advantages. In particular, the modeling architecture of the present invention enables a modeler to develop network models with optimized software implementations that may be selected prior to or dynamically during a network simulation. The present invention provides flexibility, where each protocol layer function in the protocol stack may be implemented with one or more software modules each optimized for a different objective (e.g. detailed implementation versus abstract implementation). Accordingly, only one integrated node model is required to meet different simulation objectives (e.g., detailed simulation, abstract simulation, etc.). In addition, since the present invention architecture enables plug-in of software modules, the task of upgrading and maintaining the node models is simplified.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 6 is a schematic diagram of an exemplary node configuration block of the file of FIG. 5 for a multi-tier domain within a military application according to the present invention.

FIG. 7 is a schematic diagram of an exemplary node configuration block of the file of FIG. 5 for an aerial domain within a military application according to the present invention.

FIG. 8 is a schematic diagram of an exemplary node configuration block of the file of FIG. 5 for a sensor domain within a military application according to the present invention.

FIG. 11 is schematic diagram of an exemplary format for a node model configuration file used to generate a node model according to the present invention.

DETAILED DESCRIPTION OF THE PREFERRED EMBODIMENTS

A modeling architecture is employed by a network modeling and simulation system according to the present invention. The modeling architecture enables a modeler to develop network models with optimized software implementations that may be selected prior to or dynamically during a network simulation. The node model enables a user to perform network simulation or analysis of varying detail or granularity. The present invention node model may be utilized to support network modeling projects for various applications (e.g., military, commercial, etc.). By way of example only, the present invention is described with reference to the OPNET simulation environment available from OPNET Technologies, Inc. of Bethesda, Md. However, the present invention may be implemented with any suitable network simulation systems.

Figure 1:
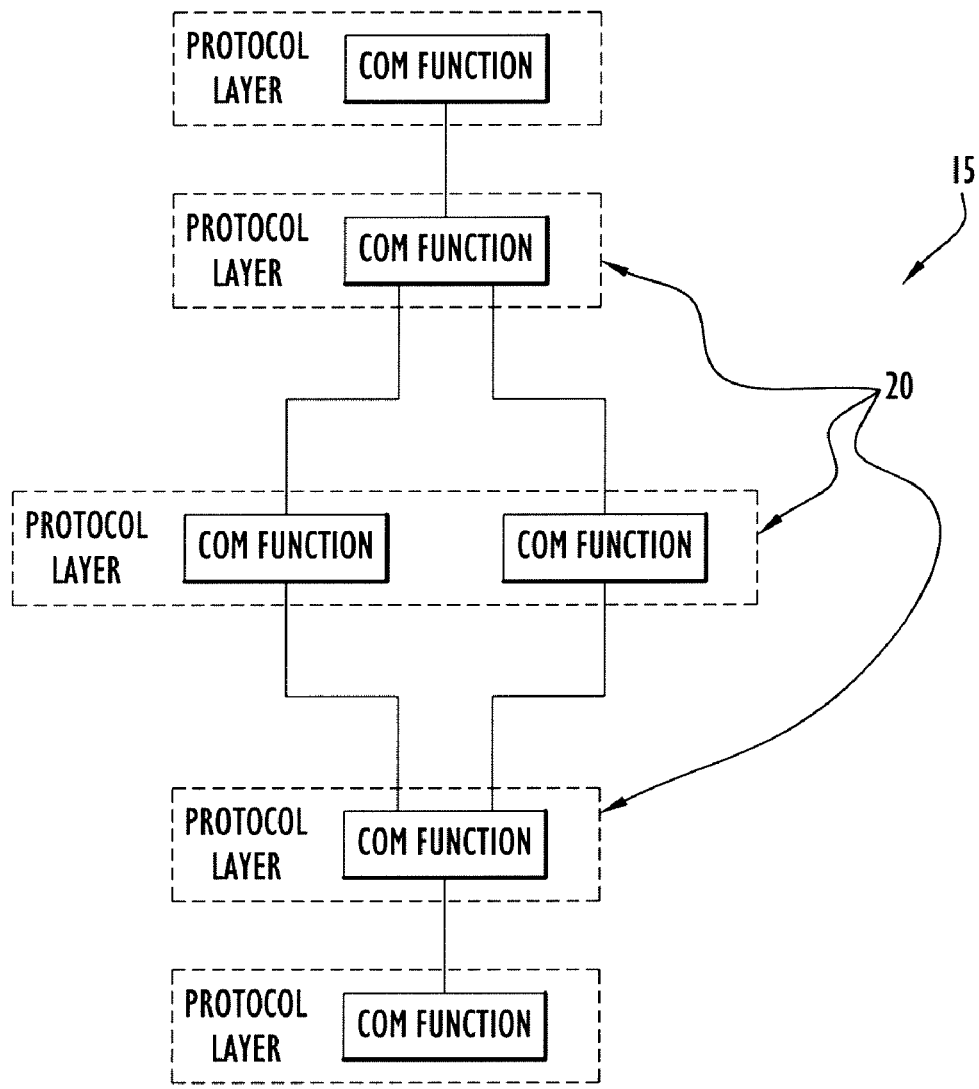
FIG. 1 is a schematic diagram of a conventional node model architecture.
Figure 2:
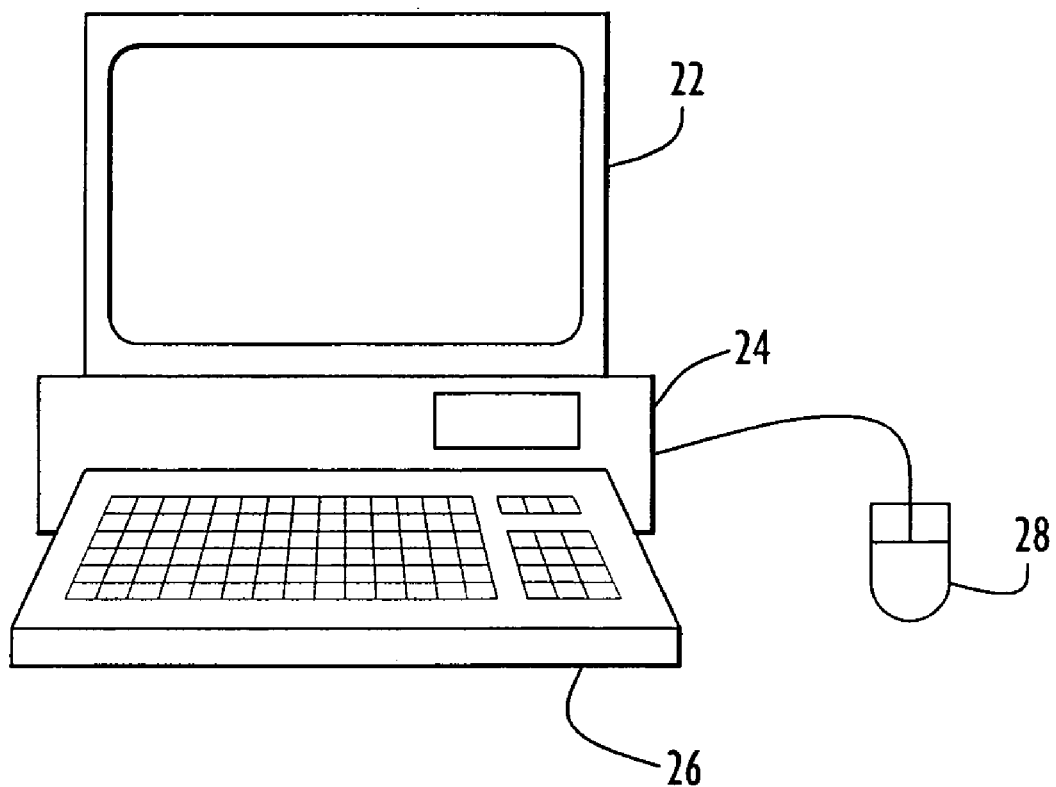
FIG. 2 is a perspective view of an exemplary computer system or workstation employed by the present invention.

The network simulation system of the present invention is preferably implemented by a computer system or workstation as illustrated, by way of example only, in FIG. 2. Specifically, the computer system is typically implemented by a conventional personal or other suitable computer system or workstation preferably equipped with a display or monitor 22, a base 24 (e.g., including the processor, memories and/or internal or external communications devices (e.g., modem, network cards, etc.)), a keyboard 26 and optional mouse 28 or other input device. The computer system includes software (e.g., operating system, simulation software, network and node modeling software of the present invention, etc.) and appropriate components (e.g., processor, disk storage or hard drive, etc.) including sufficient processing and storage capabilities to effectively execute that software. The simulation and modeling software may be implemented in any desired computing language with the computer system utilizing any of the major platforms (e.g., Linux, Macintosh, Unix, OS2, Windows, etc.). The computer system, under software control, basically implements the network simulation tool of the present invention for enabling user configurable simulations of networks. The computer system preferably operates as a stand-alone tool. However, the present invention may be in the form of an embeddable system (e.g., within another system, as an embeddable software component within other software, etc.) or the computer system may function as a server in communication with client or user systems to process client requests. The present invention software may be available on a recordable medium (e.g., magnetic, optical, floppy, DVD, CD, etc.) or in the form of a carrier wave or signal for downloading from a source via a communication medium (e.g., bulletin board, network, WAN, LAN, Intranet, Internet, etc.).

Figure 3:
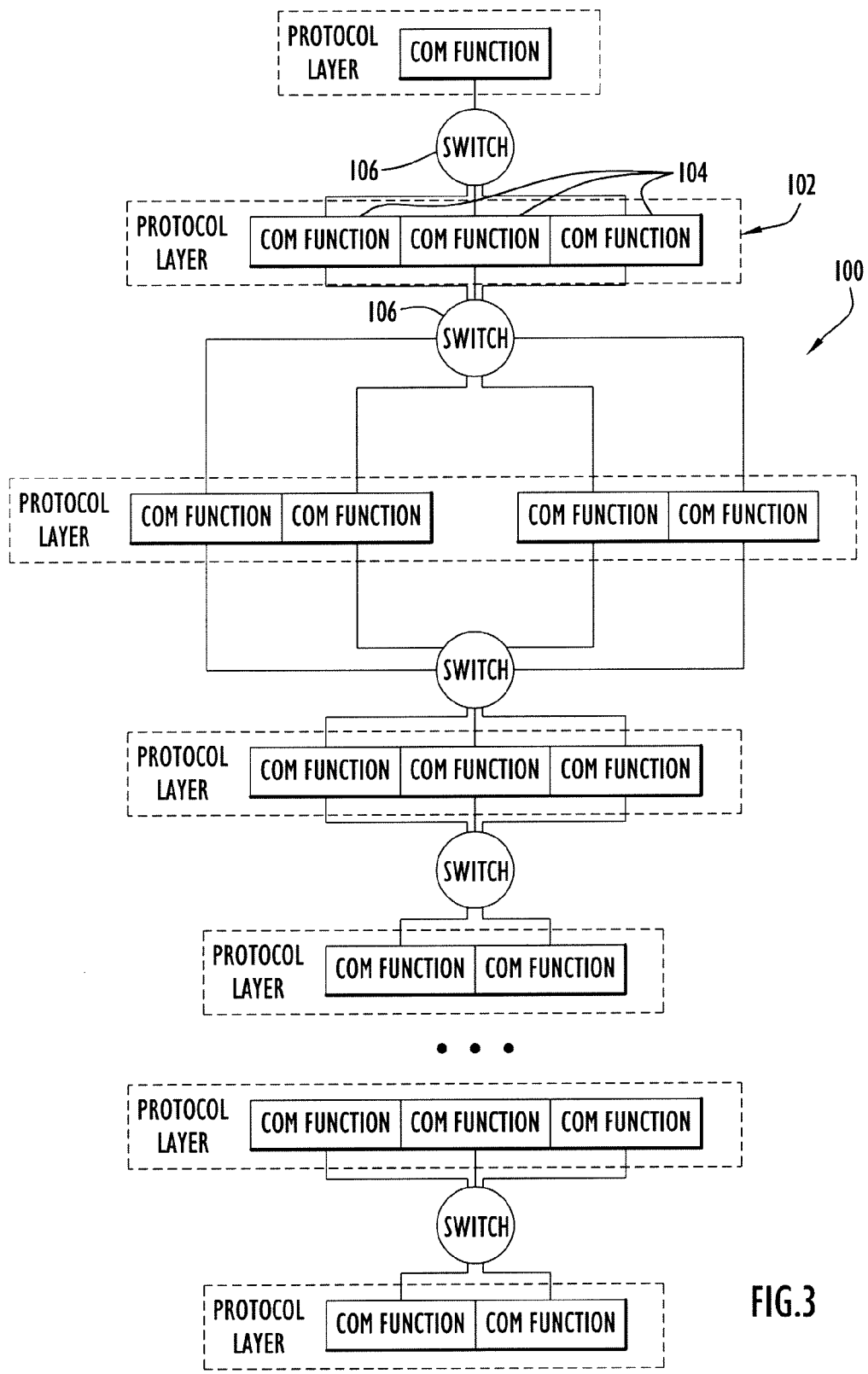
FIG. 3 is a schematic diagram of a node model architecture according to the present invention.

A node model architecture for modeling and simulation according to the present invention is illustrated in FIG. 3. Initially, this architecture may be implemented in various forms to model or simulate a communications node (e.g., software modules, data structures, hardware modules, etc.). Specifically, node model 100 includes a communication protocol stack with a plurality of protocol layers 102. These protocol layers generally correspond to layers within conventional communication protocol stacks (e.g., physical layer, link or Medium Access Control (MAC) layer, Intranet layer, transport layer, network layer, session layer, application layer, etc.). Each protocol layer includes one or more communications functions 104 implemented as one or more versions of software implementations. A configurable module switch 106 is disposed between adjacent protocol layers to connect these different software implementations or modules to their upper and/or lower protocol layer counterparts. The behavior (e.g., simulation accuracy, simulation speed, etc.) of node model 100 may be adjusted to accommodate various simulation needs of users by configuring switches 106.

Protocol layer 102 may include various software implementations or modules to implement communications functions 104. These software modules enable the node model to perform various degrees of detail for a simulation or analysis. For example, the software modules may include implementations with different granularities (e.g., detailed, simplified, very simplified, etc.) or with different systems designs. Further, the software modules may be implementations of the same system designs and granularities, but with enhancements directed toward different software needs. By way of example, the software modules may include features for testing and debugging purposes, faster execution (without compromising simulation accuracy) or for any other suitable or desired purposes.

In order to ensure seamless operation among the different protocol layer or function implementations, the software implementations or modules for each protocol layer function in node model 100 are configured to be compatible with each of the protocol layer functions in the other protocol layers. In other words, any implementation of a protocol layer function is operationally compatible with any of the implementations of other protocol layer functions in the node model. Further, each software implementation or version of a protocol layer function is configured to be compatible with the external interfaces associated with that protocol layer function to ensure compatibility between protocol layer functions.

Configurable module switches 106 connect implementations of an upper-layer protocol layer function to a corresponding lower-layer protocol layer function. The switching of the configurable module switch is one-to-one. In other words, the switch switches intra-node signal exchange between a selected upper-layer protocol functional implementation and a selected implementation at the lower protocol layer. The switching of switch 106 is configurable either statically for each simulation or dynamically during a simulation. The node model architecture may include a physical or virtual implementation of the configurable module switch as described below.

An exemplary implementation of the present invention within the OPNET simulation system and directed toward an application for a military communications environment is described for illustrative purposes. However, the present invention may alternatively be implemented within any suitable simulation system or environment and may be utilized for various communications applications (e.g., commercial, consumer, military, etc.). The exemplary military communications environment includes a multi-tier platform, an aerial platform and a sensor platform for communication units or nodes. The multi-tier platform is typically a multiple tier, Ad-Hoc wireless network that enables communications between nodes. Each tier includes a multi-hop network operating within a corresponding frequency band. The aerial platform is generally a single tier, Ad-Hoc wireless network optimized for aerial operations to provide images between aerial nodes and ground units. The sensor platform is typically a single tier, multi-hop, Ad-Hoc wireless network that enables communications between ground sensors and control units. The OPNET simulation environment typically resides on a computer system or workstation and may be resident on the system described above for FIG. 2. Initially, the OPNET implementation of the present invention utilizes a hard-wired approach in which the configurable module switches are implemented virtually with support of static switch configurations. However, the present invention may be alternatively be implemented with physical and/or virtual configurable module switches including dynamic or static configurations as described below.

Figure 4:
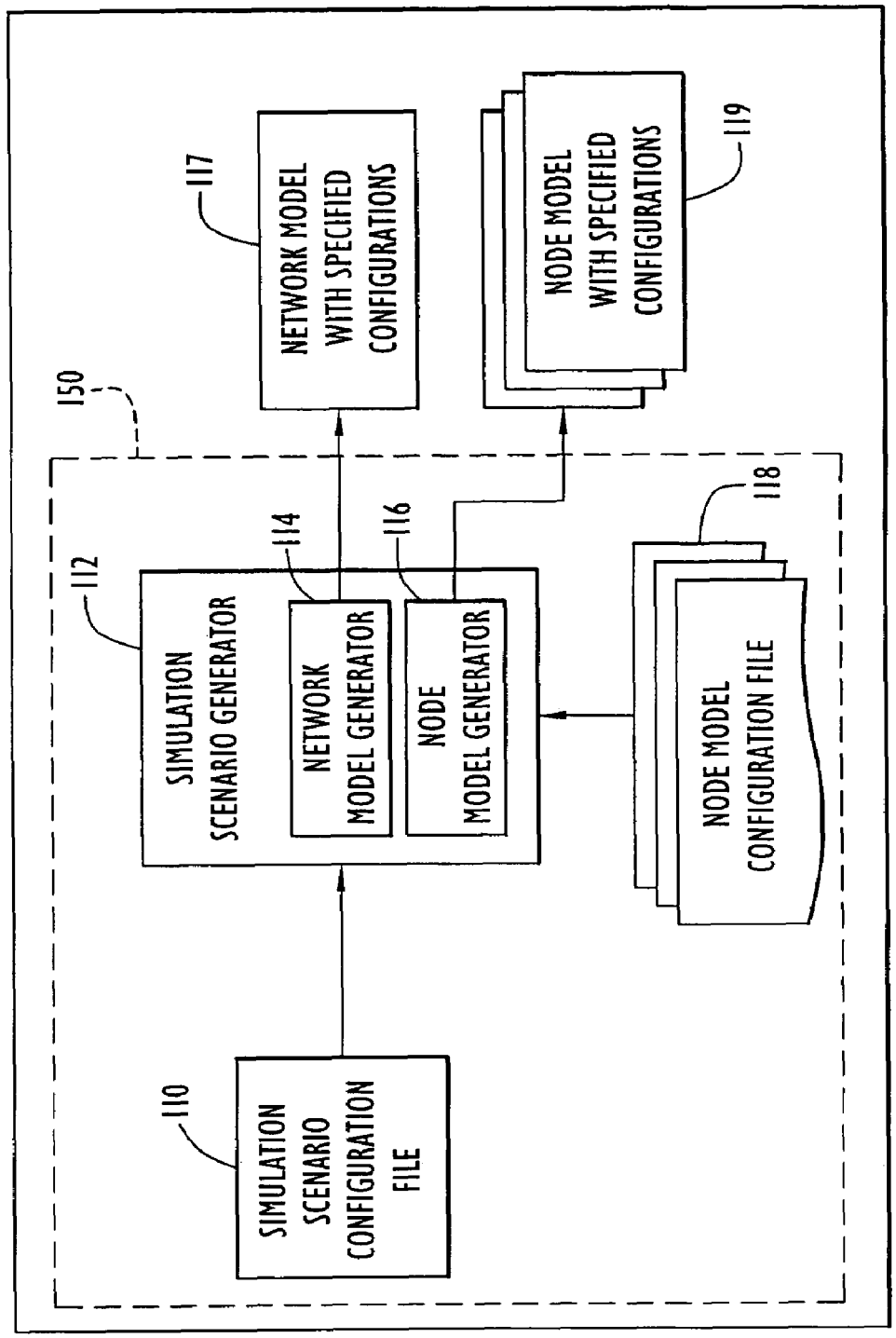
FIG. 4 is a flow diagram illustrating the manner in which a simulation scenario is generated for an OPNET simulation environment according to the present invention.

A flow diagram of the manner in which a simulation scenario is generated for an OPNET simulation according to the present invention is illustrated in FIG. 4. Specifically, a scenario generation unit or tool 150 according to the present invention includes a simulation scenario configuration file 110, a simulation scenario generator 112 and a node model configuration file 118. The scenario generation unit produces a simulation scenario for a network simulation system (e.g., OPNET) including nodes with the node model architecture of the present invention described above. The generated scenario includes information enabling the simulation system to perform network simulation. The scenario generation unit or tool is used to automate the OPNET simulation scenario generation process and eases use of the present invention with respect to performing simulations within the OPNET environment.

Simulation scenario generator 112 is typically implemented by software modules and includes a network model generator 114 and a node model generator 116. The network model generator receives simulation scenario configuration file 110 and utilizes a network model template to form a resulting network model 117 as described below. Similarly, the node model generator receives simulation scenario configuration file 110 and node model configuration file 118 and utilizes a node model template to form a resulting node model 119 as described below. The network model template may be initially created by a user via a graphical user interface (GUI) tool of the simulation system (e.g., OPNET), where the configuration for the network may be entered graphically. A tool within the simulation system converts entered graphical information into a file or program containing source code. The node model template may be created in a similar fashion. By way of example, the OPNET simulation system generates an External Model Access (EMA) file or program from the graphical information to represent and reproduce a network or node model. The EMA file is generally text-based and produced in the 'C' programming language. Alternatively, the EMA file may be produced from custom software modules based on a user-specified description of the network or node configuration.

The EMA files or programs for the network and node models serve as templates and are modified by the network model generator and node model generator to produce the network and node models for the OPNET simulation system based on the simulation and node model configuration files. This is accomplished with the assistance of software modules from an EMA utility library (e.g., typically implemented in the 'C' programming language) of the OPNET simulation system serving as an application programming interface (API). The resulting modified EMA files for the network and node models are utilized by the simulation system to simulate the network as described below. By way of example only, network model generator 114 and node model generator 116 are implemented in the C/C++ computing language and utilize the EMA utility library of the OPNET simulation system. However, the network and node model generators, templates and utility library may be implemented in any suitable computing language and utilize any custom or predefined software modules. Further, the scenario generation unit may be configured for compatibility with and to produce network and node models for any suitable simulation system.

Network model generator 114 receives scenario configuration file 110 and processes that file as described below to produce network model 117 for the simulation scenario with the specified configurations. The network model defines the topology of the simulation network that may contain one or more communication nodes. The scenario configuration file provides scenario inputs to the simulation scenario generator to enable network model generator 114 to produce a network model for the OPNET simulation system. Configuration file 110 specifies the configurations for each node in the simulation scenario and is typically in the form of a text based file. Generally, one configuration file is used to specify one simulation scenario. Accordingly, a single configuration file 110 is provided to the scenario generator to produce a scenario. The name for the produced scenario EMA file (e.g., network model file 117) is derived from the name of an associated simulation scenario configuration file 110 (e.g., the same file name with a different file extension).

Figure 5:
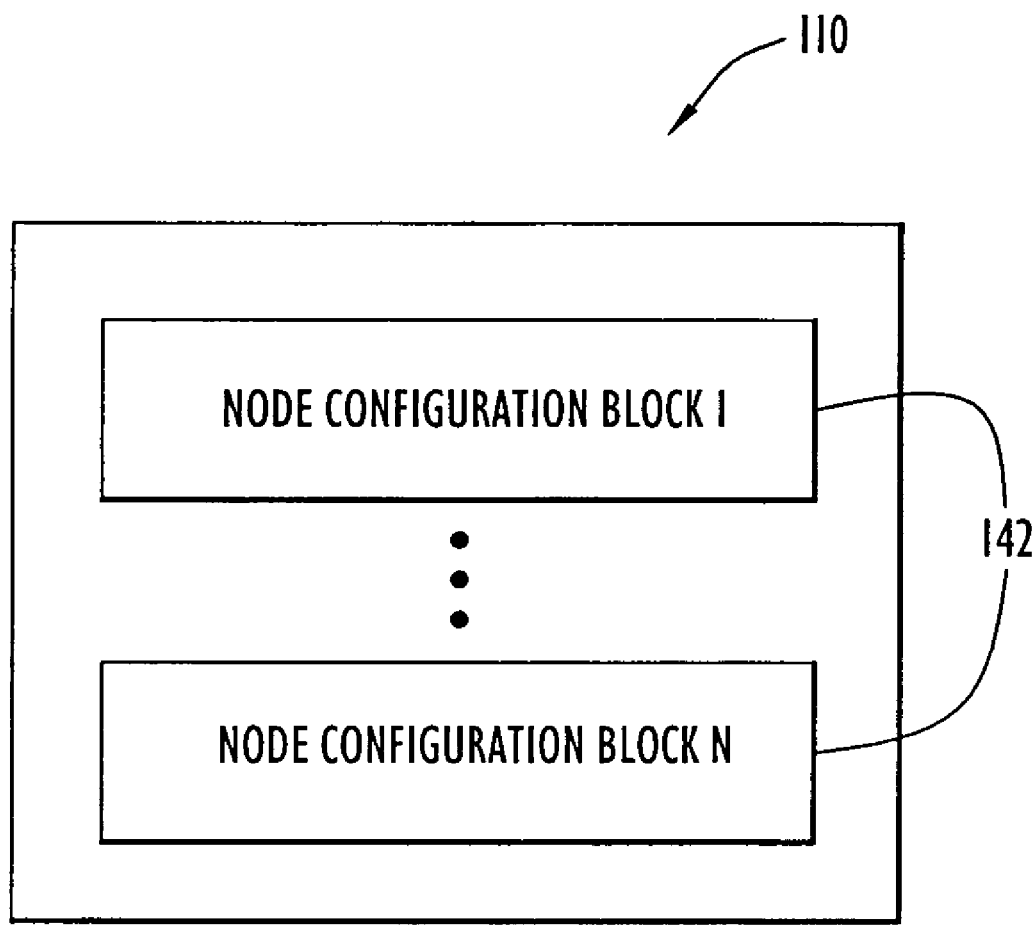
FIG. 5 is a schematic diagram of an exemplary file format for generating a simulation scenario according to the present invention.

An exemplary format for configuration file 110 is illustrated in FIG. 5. Specifically, the configuration file includes one or more node configuration blocks 142. Each block includes detailed configuration information for nodes in the military domain or platform associated with that block and utilized in the simulation scenario. The configuration information for each node within a corresponding platform typically includes a waveform IP address, a name of the corresponding OPNET node model, an initial location (e.g., with respect to X, Y and Z axes) for the node and other platform/domain specific nodal configurations.

An exemplary node configuration block for a multi-tier platform type is illustrated in FIG. 6. In particular, configuration block 142a includes configuration information of each node for this type of platform within the simulation scenario. The information is arranged in the form of a table and includes for each node: a waveform IP address; a name of a corresponding OPNET node model; and X, Y and Z coordinates representing the location of the node.

A configuration block for an aerial platform type is illustrated, by way of example only, in FIG. 7. In particular, configuration block 142b includes configuration information of each node for this type of platform within the simulation scenario. The information is arranged in the form of a table and includes for each node: a waveform IP address; a name of a corresponding OPNET node model; and X, Y and Z coordinates representing the location of the node.

An exemplary node configuration block for a sensor platform type is illustrated in FIG. 8. In particular, configuration block 142c includes configuration information of each node for this type of platform within the simulation scenario. The information is arranged in the form of a table and includes for each node: a waveform IP address; a name of a corresponding OPNET node model; and X, Y and Z coordinates representing the location of the node.

Figure 9:
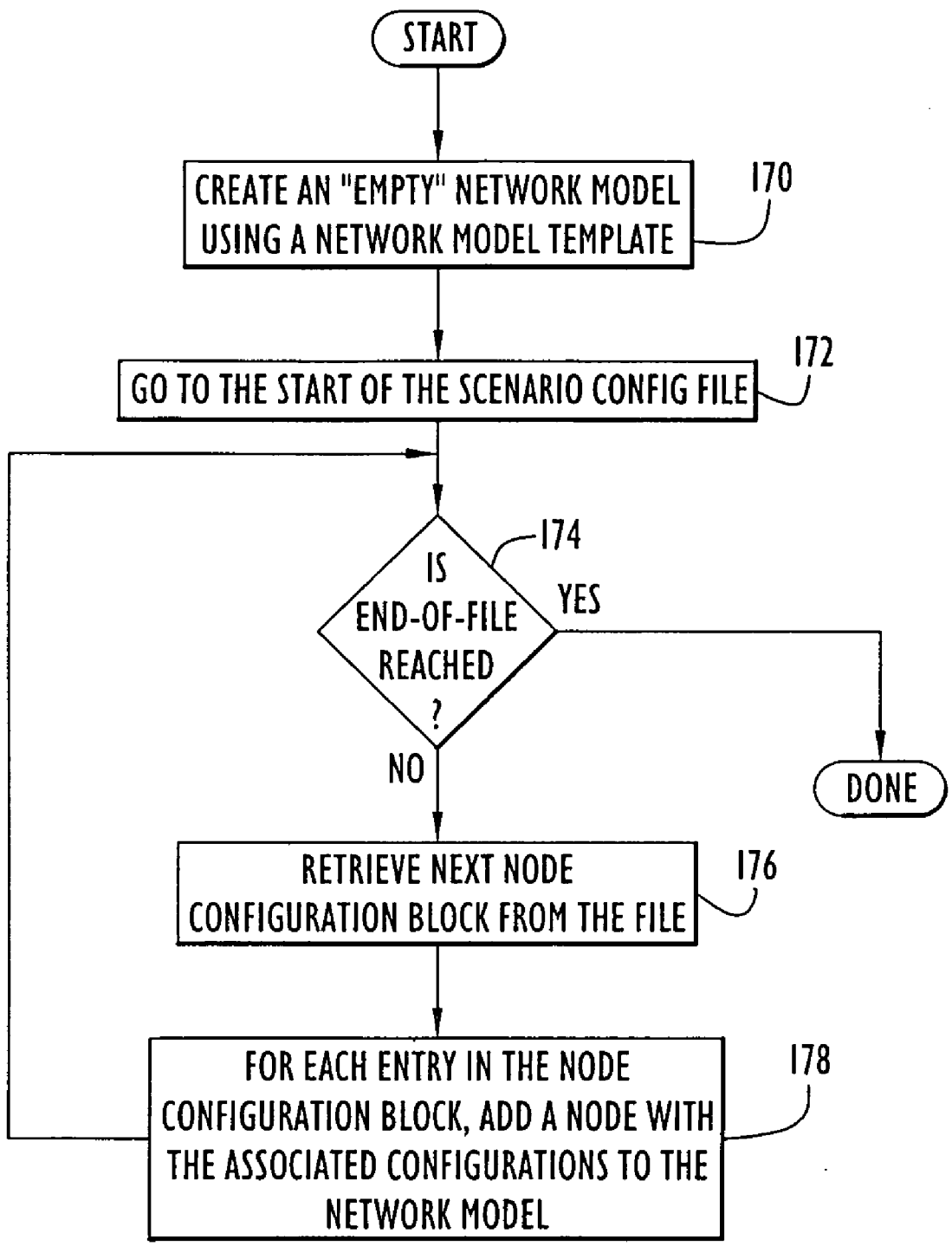
FIG. 9 is a procedural flow chart illustrating the manner in which a network model is generated according to the present invention.

The manner in which network model generator 114 produces network model 117 from configuration file 110 is illustrated in FIG. 9. Initially, an empty network model template is created by a user at step 170 via an OPNET graphical user interface (GUI) tool or custom software modules as described above. A resulting EMA file or program is produced for use by the simulation system to represent and/or reproduce the entered model. The EMA file is generally text-based and modified by the network model generator to include information from the scenario configuration file to form the network model. This is accomplished with the assistance of software modules from the EMA utility library of the OPNET simulation system serving as an application programming interface (API) as described above. In particular, the network model generator prepares to access the beginning of the configuration file at step 172. A node configuration block (e.g., FIGS. 6-8) is retrieved from the configuration file at step 176. The network model generator examines each node entry in the retrieved node configuration block (e.g., each entry within the table of FIGS. 6-8) and provides a corresponding node with the specified configurations in the network model template or EMA file at step 178.

Once each entry within a node configuration block has been processed, the network model generator determines the existence of additional configuration blocks within the configuration file. If additional configuration blocks exist as determined at step 174, the next configuration block is retrieved at step 176 and processed as described above at step 178. The above process continues until each configuration block within the configuration file has been processed as determined at step 174. The information within the resulting network model 117 (e.g., resulting modified EMA file) is utilized by the simulation system to perform network simulations in accordance with the generated scenario as described below.

Figure 10:
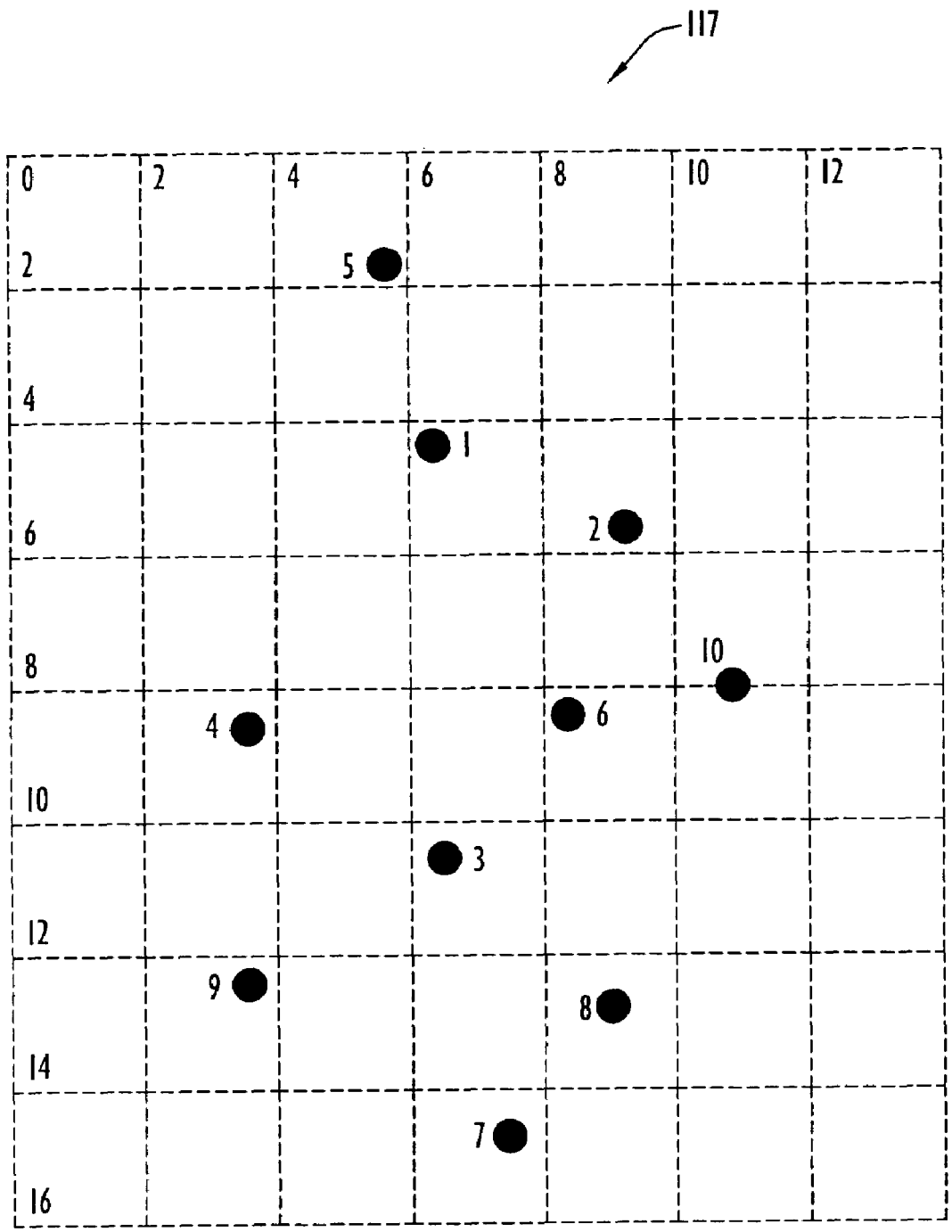
FIG. 10 is a graphical illustration of an exemplary network model produced according to the present invention.

An exemplary network model 117 generated by network model generator 114 and indicating a configuration (e.g., arrangement or location of communication nodes) for a network including communication nodes 1-10 is illustrated in FIG. 10. The resulting network model may be presented in a graphical fashion and is produced by the simulation system from the resulting network model or EMA file. The model illustrates the locations of nodes 1-10 within the network. Node information or attributes (e.g., including those contained within the scenario configuration file) may be obtained by actuating a mouse or other input device (e.g., right or left clicking, etc.) on a specific node within the displayed network model. Since one of the attributes for each node is the node model name (e.g., FIGS. 6-8), the simulation system utilizes the corresponding model during simulation to simulate each node in the network as described below. The node model for a node may be displayed by actuating a mouse or other input device (e.g., double-clicking, etc.) on a specific node within the displayed network model. Network model 117 is utilized by the simulation system to perform network simulations in accordance with the generated scenario as described below.

Referring back to FIG. 4, scenario generator 112 further receives node model configuration file 118 and processes that file as described below to produce node model 119 with the specified configurations. Node model configuration file 118 provides node model inputs to the simulation scenario generator to enable node model generator 116 to produce one or more node models 119 required by the simulation (and not available locally or in the current directory path for the scenario generation process). The configurable module switches are implemented and configured concurrently by node model generator 116 during generation of the node model as described below. The node model provides the definitions of protocol layer functions 104 (FIG. 3) employed by the node and the interconnections of those functions (e.g., configurable module switches, etc.).

The node model generator obtains configurations to produce the desired node model from node model configuration file 118. One or more node model configuration files may be provided to node model generator 116 to produce one node model for the OPNET simulation system with the configurations specified by each node configuration file. The name for the produced node model EMA file (e.g., node model file 119) is derived from the name of an associated node model configuration file (e.g., the same file name with a different file extension).

An exemplary format for node model configuration file 118 is illustrated in FIG. 11. Specifically, the configuration file includes information pertaining to a node type specifying the template or EMA file for the construction of the node model and a processor model configuration for each processor model employed by the node model. The node model configuration file is typically a text based file, where each node model configuration file includes configurations for a single corresponding node model within the OPNET simulation system. The information for the processor model configuration is arranged in the form of a table and includes for each processor model a processor model configuration name and a processor model (e.g., performing a communication protocol layer function).

Figure 12:
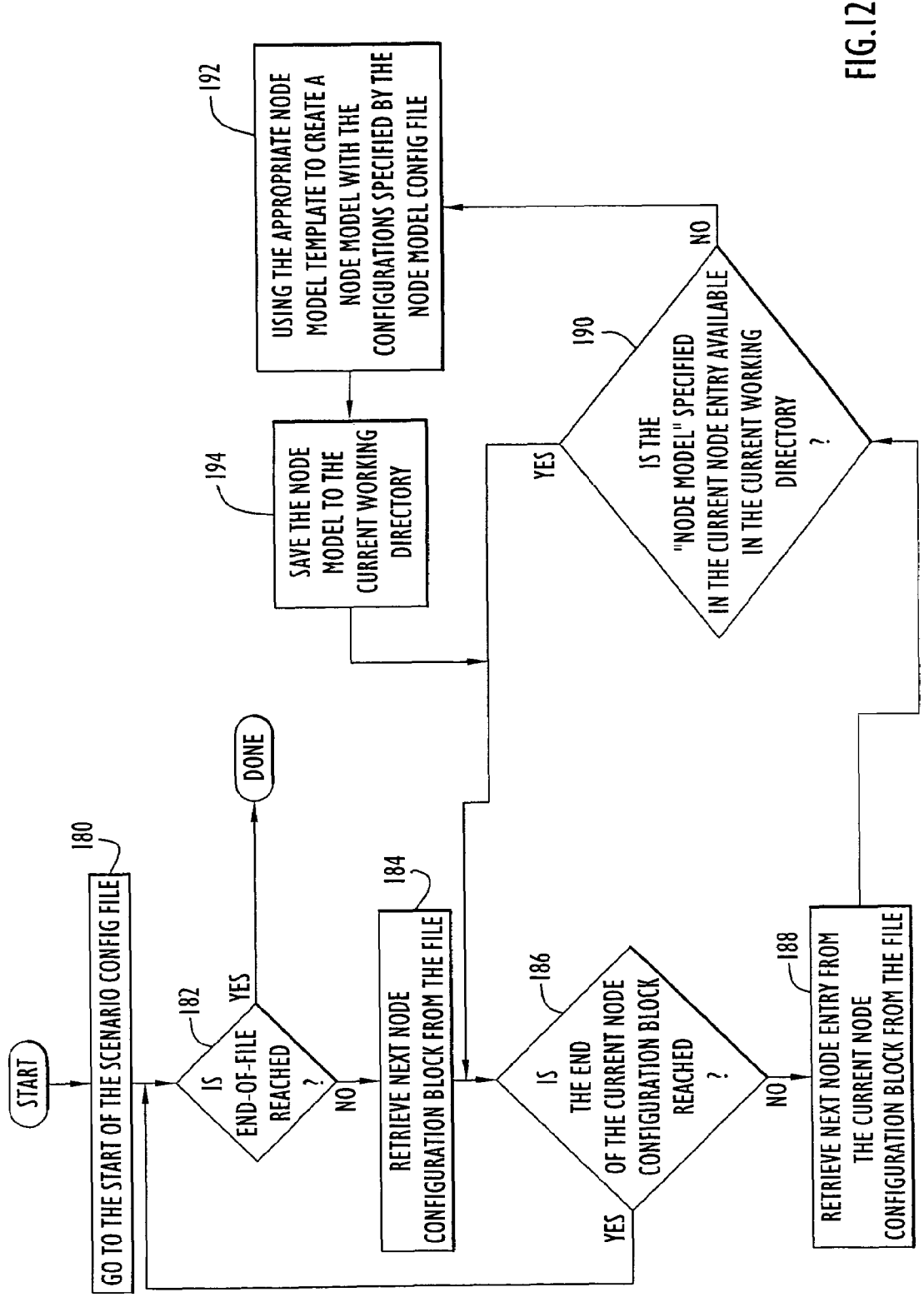
FIG. 12 is a procedural flow chart illustrating the manner in which a node model is generated according to the present invention.

The manner in which node model 119 is generated by node model generator 116 is illustrated in FIG. 12. Initially, empty node model templates are created by a user via an OPNET graphical user interface (GUI) tool or custom software modules as described above. A resulting EMA file or program is produced for use by the simulation system to represent and/or reproduce the entered node model. The EMA file is generally text-based and modified by the node model generator to include information from the simulation scenario and node model configuration files to form the node model. This is accomplished with the assistance of software modules from the EMA utility library of the OPNET simulation system serving as an application programming interface (API) as described above. In particular, the node model generator initially prepares to access the beginning of configuration file 112 at step 180. A node configuration block (e.g., FIGS. 6-8) is retrieved from the configuration file at step 184. The node model generator retrieves a node entry from the retrieved node configuration block (e.g., an entry within the table of FIGS. 6-8) at step 188.

If the node model indicated in the retrieved entry (e.g., node model name information of the blocks illustrated in FIGS. 6-8) is absent from the current working directory as determined at step 190, the node model generator utilizes the appropriate node model template to produce a node model with the configurations specified within a corresponding node model configuration file 118 at step 192. The node model template defines the node model architecture of the present invention (FIG. 3) as described above. The protocol functions 104 within protocol layers 102 are indicated by a set of configurable parameters within the node model configuration file (e.g., processor model information illustrated in FIG. 11). These parameters identify software modules within the simulation system (e.g., predefined or custom generated by a user) performing the desired protocol functions. Various software module implementations of a protocol layer function may be present within the system to enable the node model to perform varying degrees of detail for a simulation or analysis. For example, various software implementations or versions of a protocol layer function may include different granularities (e.g., detailed, simplified, very simplified, etc.) or be for use with different system designs. Further, the software module implementations may be for the same system designs and granularities, but with enhancements directed toward different software needs (e.g., features for testing and debugging purposes, faster execution (without compromising simulation accuracy) or for any other suitable or desired purposes). The node model generator provides the appropriate information within a node model template or EMA file to indicate the functions or modules associated with each protocol layer.

The configurable module switches are hard-wired in this exemplary embodiment, where the switch parameters are fixed for the node model. In this case, the node model configuration file indicates the processor models or protocol layer functions to be employed during the simulation. This effectively corresponds to a static configuration and virtual implementation of the configurable module switches. In other words, the node model configuration file represents the protocol function or software module arrangement within a node resulting from a fixed configuration of the configurable module switches. The node model generator provides the appropriate information about each function in the node model template or EMA file as described above to generate the node model. In order to employ a different function within a protocol layer for a simulation, the corresponding processor model for that function is changed in the node model configuration file to enable the node model generator to modify the node model template or EMA file, thereby producing a new node model.

However, the node model generator may alternatively provide information within the node model template to implement a dynamic configuration and virtual implementation of the configurable module switches for proper signal flow within the node. In this case, parameters to control signal flow (e.g., virtual configurable module switches) are set dynamically by a user within the simulation environment during execution of the simulation. For example, node model configuration file 118 may include each of the various versions of a function that a corresponding protocol layer may employ. The node model generator provides the appropriate information about each function within the node model template or EMA file as described above and further indicates within the node model template that the parameters for the signal flow (e.g., virtual configurable module switches) are tied to simulation settings (e.g., the parameters may be set to variables that are tied to simulation settings), where modification of the simulation settings by a user alters the signal flow. The variables may specify the versions of the protocol layer functions to employ, or be in the form of flags or other indicators to enable or disable corresponding versions of protocol layer functions during the simulation, thereby providing a virtual implementation of the configurable module switches to control signal flow. The simulation environment may alternatively apply user-specified simulation settings indicating the versions of the protocol layer functions to employ (e.g., overriding the node model settings) to accommodate the user desired configuration.

The configurable module switches may include a physical implementation, where node modules perform the switching functions. The configurable module switches are each associated with parameters indicating selections of the upper and lower layer protocol functions to be coupled by that switch. Node model configuration file 118 may include each version or software implementation of a function that a corresponding protocol layer may employ, and processor models for configurable module switches that perform switching functions or control signal exchange between functions of adjacent protocol layers. The processor models or software implementations for the switches may be predefined or custom generated by a user. The node model generator provides the appropriate information about each function within the node model template or EMA file as described above and further indicates within the node model template that parameters for a corresponding configurable module switch are tied to simulation settings (e.g., the parameters may be set to variables that are tied to simulation settings), where modification of the simulation settings by a user alters the switch configuration. The variables may control the particular signals exchanged by a corresponding switch between adjacent protocol layers, thereby providing a physical implementation of dynamically configured switches.

With respect to a physical implementation of statically configured switches, node model configuration file 118 may include each version or software implementation of a function that a corresponding protocol layer may employ and processor models for configurable module switches that perform switching functions or control signal exchange between functions of adjacent protocol layers as described above. The node model generator provides the appropriate information about each function within the node model template or EMA file as described above and further indicates within the node model template fixed parameters for each configurable module switch to control particular signals exchanged by the switches between adjacent protocol layers. The fixed parameters may be indicated in the node model configuration file or generated during creation of the node model template. In order to employ a different software implementation or version of a protocol layer function for a simulation, the parameters for a corresponding switch are changed to enable the node model generator to modify the node model template or EMA file, thereby producing a new node model.

Once each entry within a node configuration block has been processed in the manner described above as determined at step 186, the node model generator determines the existence of additional configuration blocks within the configuration file. If additional configuration blocks exist as determined at step 182, the next configuration block is retrieved at step 184 and processed as described above. The above process continues until each configuration block within configuration file 110 has been processed as determined at step 182.

Figure 13:
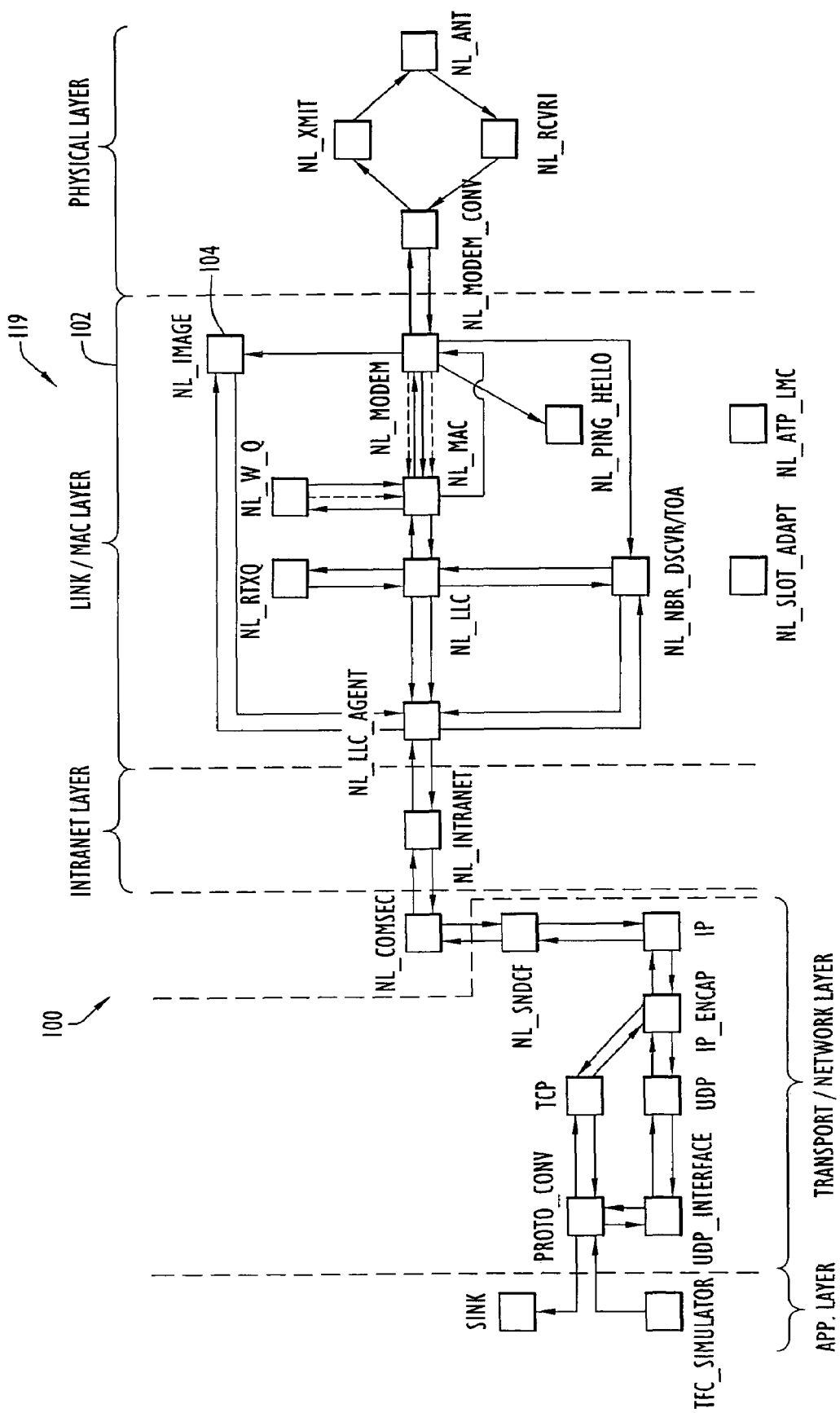
FIG. 13 is a graphical illustration of an exemplary node model produced according to the present invention.

An exemplary node model 119 generated by node model generator 116 is illustrated in FIG. 13. By way of example only, the exemplary node model reflects the virtual implementation and static configuration of configurable module switches described above (e.g., the node model configuration file including the nodes employed during a simulation). The resulting node model may be presented in a graphical fashion and is produced by the simulation system from the resulting node model or EMA file. Node model 119 includes node model architecture 100 (FIG. 3) described above with various functions or modules 104 within protocol layers 102 (e.g., Physical Layer, Link/MAC layer, Intranet Layer, Transport/Network Layer and Application Layer). Configurable module switches 106 are absent from the node model since the exemplary model reflects a virtual implementation and static configuration of the configurable module switches as described above (e.g., the node model configuration file including the nodes employed during a simulation). Module information or attributes (e.g., including those contained within the node model configuration file) may be obtained by actuating a mouse or other input device (e.g., right or left clicking, etc.) on a specific module within the displayed node model. Since one of the attributes for each module is the processor model name (FIG. 11), the simulation system utilizes the corresponding processor model to simulate each node function in the network as described below. The process model for a module may be displayed by actuating a mouse or other input device (e.g., double-clicking, etc.) on a specific module within the displayed network model. Node models 119 are utilized by the simulation system to perform network simulations in accordance with the generated scenario as described below.

Figure 14:
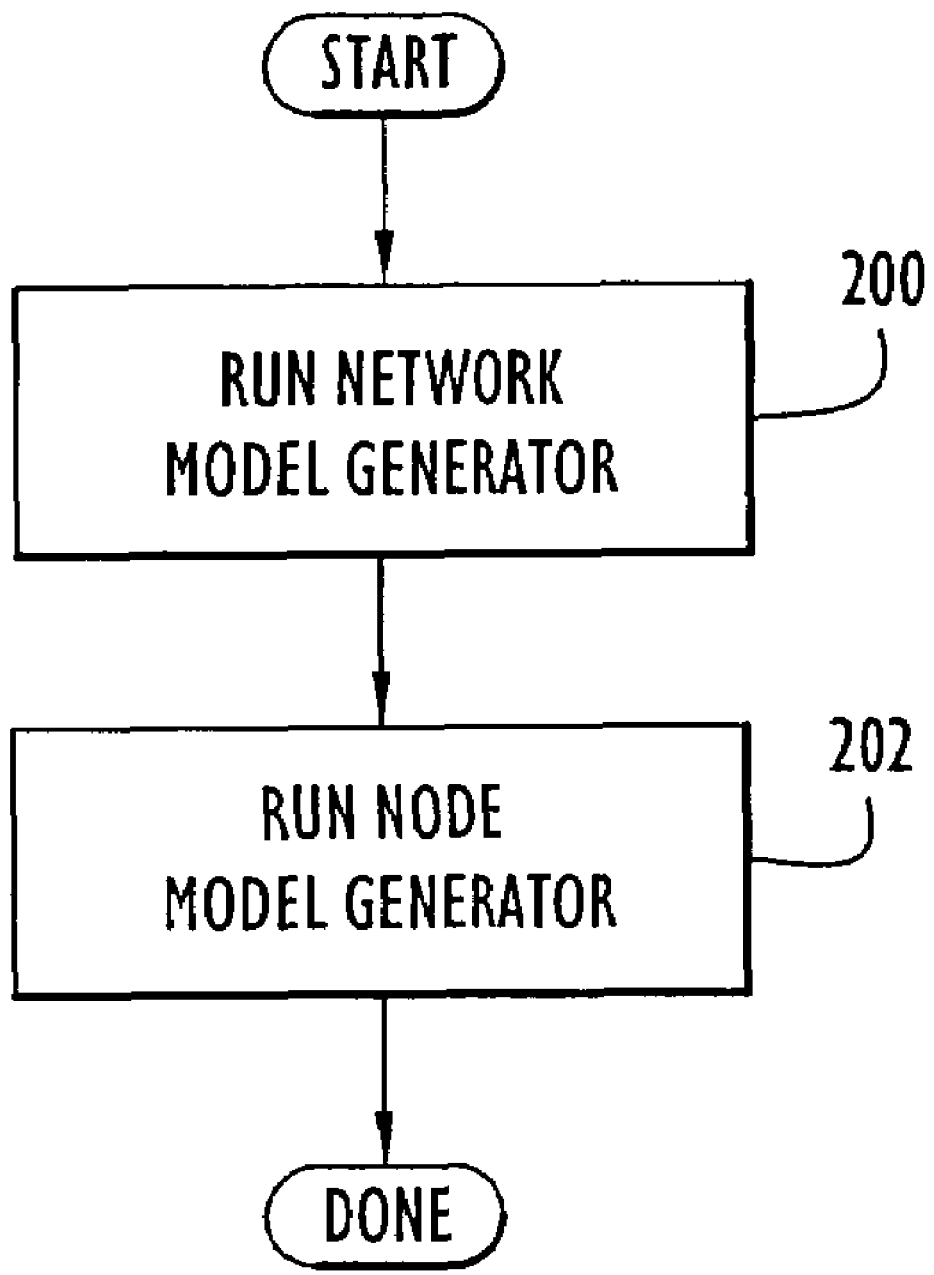
FIG. 14 is a procedural flow chart illustrating the manner in which a simulation scenario is generated according to the present invention.

The manner in which the simulation scenario is generated by simulation generation unit 150 is illustrated in FIGS. 4, 14. In particular, scenario generator 112 initially generates network model 117 for the simulated network as described above using information provided by simulation scenario configuration file 110 at step 200. The scenario generator further produces node models 119 for nodes within the scenario configuration file at step 202 in the manner described above.

Once the network and node models have been produced, the simulation system utilizes the network and node models to perform a network simulation. In particular, the simulation system initially identifies the configuration of the simulated network from the information within generated network model 117 (FIG. 4). The simulation system further ascertains the types of nodes for the simulation from the network model information and loads the corresponding node definitions from generated node models 119 associated with those node types. The simulation process subsequently commences using software modules (e.g., predefined within the simulation system, custom generated by a user or third party, etc.) identified in the node definitions (e.g., processor models) to perform node and/or network functions. Thus, the processing and functions of each node may be performed by the simulation system to simulate network operation. The configurable module switches enable a user to select the particular versions or software implementations of protocol layer functions to employ during a simulation, thereby controlling the level of detail or analysis and the functions performed for the simulation.

It will be appreciated that the embodiments described above and illustrated in the drawings represent only a few of the many ways of implementing a network modeling system and method of simulating network operation with configurable node models.

The present invention may be implemented within any suitable simulation system or environment and may be utilized for various communications applications (e.g., commercial, consumer, military, etc.).

The computer system of the present invention may be implemented by any quantity of any personal or other type of computer or processing system or workstation (e.g., IBM-compatible, Apple, Macintosh, laptop, palm pilot, microprocessor, etc.). The computer system may include any commercially available operating system (e.g., Windows, OS/2, Unix, Linux, etc.), any commercially available and/or custom software (e.g., communications software, simulation software, network and node modeling software, etc.) and any types of input devices (e.g., keyboard, mouse, microphone, voice recognition, etc.). It is to be understood that the software of the present invention (e.g., network model generator, node model generator, scenario and node model configuration files, network and node model templates, network and node model template generators, software implementations of the configurable module switches or other functions, etc.) may be implemented in any desired computer language, and could be developed by one of ordinary skill in the computer and/or programming arts based on the functional description contained herein and the flow charts illustrated in the drawings. Further, any references herein of software performing various functions generally refer to computer systems or processors performing those functions under software control. The computer system may alternatively be implemented by hardware or other processing circuitry.

The various functions of the present invention may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The software and/or algorithms described above and illustrated in the flow charts and diagrams may be modified in any manner that accomplishes the functions described herein. The present invention software (e.g., network model generator, node model generator, scenario and node model configuration files, network and node model templates, network and node model template generators, software implementations of the configurable module switches or other functions, etc.) may be available on a recordable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The node model architecture of the present invention may include any quantity of protocol layers, where each layer may include any quantity of corresponding protocol functions. The functions may be associated with any quantity of software implementations or versions for selection during a simulation, where each version may provide different features for the simulation (e.g., debugging, granularity, etc.). The architecture may further include any quantity of configurable switches to couple two or more protocol functions within any desired protocol layers. The architecture may be arranged in any fashion to model any suitable communications protocol or protocol stack. The node model architecture may be employed to simulate any type of communication or other node to control signal flow between node modules. The node model architecture may be employed with any suitable network or other simulation system and may be implemented in any suitable forms to model or simulate a communications node (e.g., software modules, data structures, files, hardware modules, etc.). The software modules may be of any suitable computing language, while the data structures and files may be arranged in any fashion and include any quantity of any types of storage units or fields (e.g., records, arrays, lists, etc.).

The configurable module switches may be implemented virtually or physically and include static or dynamic configurations. The switches may be implemented by any quantity of any suitable software and/or hardware modules. The switches may be disposed at any suitable locations and may couple any quantity of protocol layer or other functions to control signal flow. The switches may receive any quantity of any types of parameters to couple the functions (e.g., function names, flags, etc.). The parameters for the switches (e.g., virtual or physical) may be tied to any suitable simulation system or other settings or parameters to dynamically control or configure the switches and/or signal flow during a simulation.

The network model generator may produce any models for any desired network configuration. The resulting model file may be of any quantity, may be arranged in any fashion and may include any network information describing the network configuration (e.g., nodes, locations, etc.). The resulting network model file may include any computing language or other statements or information compatible with a simulation system. The network model template may include any desired information and any portion of a network configuration. The network model template may include any computing language or other statements or information compatible with a simulation system and may be generated from graphical input, custom software modules (e.g., of any suitable computing language etc.) or any other technique (e.g., created by a user in an editor, etc.). The network model template may be modified in any fashion via any techniques (e.g., API, direct editing, editor, etc.) to include the network information and form the network model. The simulation scenario configuration file may be of any quantity and include any desired information (e.g., nodes, locations, models, etc.). The scenario configuration file may be arranged in any fashion and include any quantity of node configuration blocks. The node configuration blocks may be arranged in any fashion and may include any information pertaining to a node (e.g., location, addresses, type, etc.). The node configuration blocks may be associated with any quantity of any domains within the network, where the domains may be selected based on any suitable criteria (e.g., location, node type, network type, etc.). The network template and resulting model file may include any desired filename and/or extension.

The node model generator may produce any models for any desired node configuration. The resulting model file may be of any quantity, may be arranged in any fashion and may include any network information describing the node configuration (e.g., locations, modules, functions, etc.). The resulting node model file may include any computing language or other statements or information compatible with a simulation system. The node model template may include any desired information and any portion of a node configuration.

The node model template may include any computing language or other statements or information compatible with a simulation system and may be generated from graphical input, custom software modules (e.g., of any suitable computing language etc.) or any other technique (e.g., created by a user in an editor, etc.). The node model template may be modified in any fashion via any techniques (e.g., API, direct editing, editor, etc.) to include the node information and form the node model. The node model configuration file may be of any quantity and include any desired information (e.g., nodes, locations, models, etc.). The node model configuration file may be arranged in any fashion. The node template and resulting model file may include any desired filename and/or extension.

It is to be understood that the present invention is not limited to the specific applications described above, but may be applied to the development of networking models for any types of communication devices. The advantages of the present invention are especially dramatic in large-scale network models where abstract versions of the model (e.g., entire or any portions thereof) are required in order to make the network simulation practical.

From the foregoing description, it will be appreciated that the invention makes available a novel network modeling system and method of simulating network operation with configurable node models, wherein a network simulation system employs configurable node models to selectively enable varying levels of network analysis (e.g., low or high level granularity).

Having described preferred embodiments of a new and improved network modeling system and method of simulating network operation with configurable node models, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for modeling and simulating a network including a plurality of nodes comprising:
a processing system to model and simulate said network, said processing system including:
a node model generation unit to produce a node model defining a reconfigurable network node to enable said processing system to simulate different configurations of said network node, wherein said node model includes a communications protocol stack with a plurality of protocol layers each including one or more individually selectable function modules for performing communications protocol layer functions, and at least one selectively configurable module switch each disposed between adjacent ones of said protocol layers to selectively couple said function modules of said adjacent protocol layers, wherein each of said function modules of said protocol layers are selectable by a corresponding configurable module switch and at least one protocol layer includes a plurality of said individually selectable function modules, wherein said at least one configurable module switch is dynamically configured during said simulation based on one or more simulation settings and controls said coupling of said function modules to configure said node for a desired behavior during said simulation, and wherein said one or more simulation settings are modifiable by a user and said modifiable simulation settings override a previous node configuration.

2. The system of claim 1, wherein said processing system further includes configuration information pertaining to configurations of said network nodes, and a node model template providing an initial configuration for said node model, and wherein said node model generation unit includes:
   a template processing module to modify said node model template in accordance with said configuration information for said corresponding network node to form said node model.

3. The system of claim 1, wherein said processing system further includes:
   a network model generation unit to produce a network model to enable said processing system to simulate said network.

4. The system of claim 3, wherein said processing system further includes network information pertaining to configurations of said network, and a network model template providing an initial configuration for said network model, and wherein said network model generation unit includes:
   a template processing module to modify said network model template in accordance with said network information to form said network model.

5. The system of claim 3, wherein said processing system further includes:
   a simulation module to process said network and node models to simulate operation of said network.

6. A computer-implemented method of modeling and simulating a network including a plurality of nodes on a processing system comprising:
   (a) representing each network communication node, via said processing system, in the form of a node model defining a reconfigurable network communication node to enable said processing system to simulate different configurations of said communication node, wherein said node model includes a communications protocol stack with a plurality of protocol layers each including one or more individually selectable function modules for performing communications protocol layer functions, and at least one selectively configurable module switch each disposed between adjacent ones of said protocol layers to selectively couple said function modules of said adjacent protocol layers;
   (b) assigning, via said processing system, one or more individually selectable function modules to each protocol layer, wherein at least one protocol layer includes a plurality of said individually selectable function modules, and wherein each of said function modules of said protocol layers are selectable by a corresponding configurable module switch;
   (c) selectively configuring said at least one configurable module switch, via said processing system, wherein said at least one configurable module switch is dynamically configured during said simulation based on one or more simulation settings, wherein said at least one configurable module switch controls said coupling of said function modules to configure said communication node for a desired behavior during said simulation, and wherein said one or more simulation settings are modifiable by a user and said modifiable simulation settings override a previous communication node configuration; and
   (d) simulating said network, via said processing system, in accordance with said configured node models.

7. The method of claim 6, wherein said processing system includes configuration information pertaining to configurations of said network nodes, and a node model template providing an initial configuration for said node model, and wherein step (c) further includes:
   (c.1) modifying a node model template in accordance with said configuration information, said assignment and said selective configuration for a corresponding network node to form said node model for that node.

8. The method of claim 6, wherein step (a) further includes:
   (a.1) producing a network model to enable simulation of said network.

9. The method of claim 8, wherein said processing system further includes network information pertaining to configurations of said network, and a network model template providing an initial configuration for said network model, and wherein step (a.1) further includes:
   (a.1.1) modifying said network model template in accordance with said network information to form said network model.

10. The method of claim 8, wherein step (d) further includes:
    (d.1) processing said network and node models to simulate operation of said network.

11. An apparatus including a computer readable memory device with computer logic recorded thereon, wherein said computer logic is executed by a processor for modeling a network including a plurality of nodes and comprises:
    a node model defining a reconfigurable network node to simulate different configurations of said network node, wherein said node model includes a communications protocol stack with a plurality of protocol layers each including one or more individually selectable function modules for performing communications protocol layer functions, and at least one selectively configurable module switch each disposed between adjacent ones of said protocol layers to selectively couple said function modules of said adjacent protocol layers, wherein each of said function modules of said protocol layers are selectable by a corresponding configurable module switch and at least one protocol layer includes a plurality of said individually selectable function modules, wherein said at least one configurable module switch is dynamically configured during said simulation based on one or more simulation settings, wherein said at least one configurable module switch controls said coupling of said function modules to configure said node for a desired behavior during said simulation, and wherein said one or more simulation settings are modifiable by a user and override a previous node configuration.

12. The apparatus of claim 11, wherein said memory device further includes:
    configuration information pertaining to configurations of said network nodes; and
    a node model template providing an initial configuration for said node model; and
    said computer logic further includes:
        a node model generation unit to produce said node model, wherein said node model generation unit includes:
            a template processing module to modify said node model template in accordance with said configuration information for said network node to form said node model.

13. The apparatus of claim 11, wherein said computer logic further includes:
    a network model to enable simulation of said network.

14. The apparatus of claim 13, wherein said memory device further includes:

network information pertaining to configurations of said network; and a network model template providing an initial configuration for said network model; and said computer logic further includes:

a network model generation unit to produce said network model, wherein said network model generation unit includes:

a network template processing module to modify said network model template in accordance with said network information to form said network model.

15. The apparatus of claim 11, wherein said computer logic further includes:

a node model generation unit to generate said node model in accordance with node configuration information; and a network generation unit to generate a network model in accordance with network configuration information.

16. The apparatus of claim 15, wherein said computer logic further includes:

a simulation module to process said network and node models to simulate operation of said network.

* * * * *